UNITED STATES PATENT OFFICE.

HENRY MARTIN LUDEWIG WUNNENBERG, OF KLAUSTHAL, GERMANY, ASSIGNOR TO THE FIRM OF AROTA, GESELLSCHAFT MIT BESCHRÄNKTER HAFTUNG, OF HAMBURG, GERMANY.

COMPOSITION OF MATTER TO BE USED AS AN OIL-PAINT.

1,057,199.     Specification of Letters Patent.     Patented Mar. 25, 1913.

No Drawing.     Application filed December 16, 1911. Serial No. 666,252.

*To all whom it may concern:*

Be it known that I, HENRY MARTIN LUDEWIG WUNNENBERG, a subject of the German Emperor, residing at Klausthal, Germany, have invented a new and useful Composition of Matter to be Used as an Oil-Paint, of which the following is a specification.

It is well known that oil color coatings adhere very indifferently to cement plaster unless the latter is thoroughly dry and set.

In accordance with the present invention covering coatings can be obtained which are readily received by and adhere firmly to plaster even when freshly mixed. Those coatings are obtained by mixing a vehicle as oil or varnish with very finely ground silver dross and cement and utilizing this mixture, with or without the addition of coloring materials as a covering coat. Silver dross is a slag resulting from the cupellation of silver and lead in the silver refining process and is constituted by metal silicates of which the furnace consists after its original materials (silicates) of aluminium, magnesium and the like have absorbed the foreign metallic substances usually associated with silver such for instance as lead, zinc, and copper. This substance which contains lead and zinc in combination with silicic acid is distinguished by its power of absorbing varnish and has already been employed mixed with varnish as a coating for preventing rust; this mixture does not, however, adhere to freshly mixed cement plaster, nor does cement alone ground with a vehicle as oil or varnish; it is only by the admixture of both the said materials to the vehicle oil or varnish, that the desired result is obtained.

Suitable compositions may be formed by proportioning the materials as follows:

I. 125 parts in weight silver dross,
    62.5 " " " Portland cement,
    25 " " " ocher.

To 100 parts of this mixture are added 45 parts linseed-oil-varnish.

II. 125 parts in weight silver dross,
    63 " " " Portland cement,
    12 " " " ocher,
    13 " " " sulfate of barium.

45 parts linseed-oil-varnish to 100 weights of this mixture.

III. 100 parts in weight silver dross,
    50 " " " Portland cement,
    200 " " " sulfid of zinc.

450 parts linseed-oil-varnish to 100 weights of the mixture.

I claim:

The herein described composition of matter, consisting of a mixture of silver dross and cement with a vehicle, substantially as described and for the purpose specified.

HENRY MARTIN LUDEWIG WUNNENBERG.

Witnesses:
    MAX F. A. KAEMPFF,
    ERNEST H. L. MUMMENHOFF.

---

Copies of this patent may be obtained for five cents each, by addressing the "Commissioner of Patents, Washington, D. C."